United States Patent
Mainguet

(10) Patent No.: US 12,154,462 B2
(45) Date of Patent: Nov. 26, 2024

(54) DISPLAY DEVICE WITH LOCAL DECRYPTION OF DIGITAL DATA

(71) Applicant: COMMISSARIAT A L'ENERGIE ATOMIQUE ET AUX ENERGIES ALTERNATIVES, Paris (FR)

(72) Inventor: Jean-François Mainguet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 125 days.

(21) Appl. No.: 18/056,064

(22) Filed: Nov. 16, 2022

(65) Prior Publication Data

US 2023/0169894 A1   Jun. 1, 2023

(30) Foreign Application Priority Data

Nov. 29, 2021   (FR) ..................................... 21 12666

(51) Int. Cl.
*G09F 9/30* (2006.01)
*H04L 9/40* (2022.01)

(52) U.S. Cl.
CPC ............ *G09F 9/30* (2013.01); *H04L 63/0435* (2013.01)

(58) Field of Classification Search
CPC ................................ G09F 9/30; H04L 63/0435
See application file for complete search history.

(56) References Cited

U.S. PATENT DOCUMENTS

| | | | | |
|---|---|---|---|---|
| 6,914,637 B1 * | 7/2005 | Wolf | ...................... | H04N 19/89 |
| | | | | 348/476 |
| 7,131,004 B1 * | 10/2006 | Lyle | ......................... | H04L 9/12 |
| | | | | 713/169 |
| 7,206,943 B2 * | 4/2007 | Kobayashi | ............ | H04L 9/0897 |
| | | | | 713/193 |
| 7,242,766 B1 * | 7/2007 | Lyle | ...................... | H04L 9/3271 |
| | | | | 380/2 |

(Continued)

FOREIGN PATENT DOCUMENTS

| | | |
|---|---|---|
| EP | 1 343 321 A1 | 9/2003 |
| EP | 3 381 060 A1 | 10/2018 |

(Continued)

OTHER PUBLICATIONS

French Preliminary Search Report Issued May 30, 2022, in French Application 21 12666 filed on Nov. 29, 2021 (with English Translation of Categories of Cited Documents), 2 pages.

(Continued)

*Primary Examiner* — Michael B. Pierorazio
(74) *Attorney, Agent, or Firm* — Oblon, McClelland, Maier & Neustadt, L.L.P.

(57) ABSTRACT

A display device including an array of display blocks, each display block including luminous elements and a driving circuit for the luminous elements; an array of control circuits associated with the display blocks; and a video card receiving an encrypted digital signal to be displayed and sending the encrypted digital data to be displayed to the control circuits Each control circuit includes: a first memory circuit receiving and storing the encrypted digital data; a second memory circuit storing a decryption key; and a decryption circuit decrypting the encrypted digital data using the decryption key.

14 Claims, 9 Drawing Sheets

(56) References Cited

U.S. PATENT DOCUMENTS

| | | | |
|---|---|---|---|
| 2005/0066356 A1* | 3/2005 | Stone | H04N 21/4408 380/255 |
| 2007/0274348 A1* | 11/2007 | Friedman | H04J 3/0697 370/503 |
| 2008/0180518 A1* | 7/2008 | Miyazaki | H04N 21/4405 375/E7.025 |
| 2008/0307496 A1* | 12/2008 | Kurose | H04N 21/4367 726/2 |
| 2009/0040287 A1* | 2/2009 | Miyazaki | H04N 21/4367 348/14.01 |
| 2010/0037253 A1* | 2/2010 | Sheehan | H04N 21/2347 725/35 |
| 2015/0277840 A1* | 10/2015 | Ninan | G09G 5/026 345/589 |
| 2016/0012772 A1* | 1/2016 | White | G09G 3/2085 345/80 |

FOREIGN PATENT DOCUMENTS

| | | |
|---|---|---|
| EP | 3 550 550 A1 | 10/2019 |
| EP | 3 649 672 A1 | 5/2020 |
| KR | 10-2017-0040164 A | 4/2017 |
| WO | WO 2017/089676 A1 | 6/2017 |

OTHER PUBLICATIONS

Oikonomakos et al.: "Implementing Cryptography on TFT Technology for Secure Display Applications" CARDIS 2006: Proceedings of the 7th IFIP WG 8.8/11.2 international conference on Smart Card Research and Advanced Applications, Apr. 2006, 24 Pages.

Templier et al.: "A New Approach for Fabricating High-Performance MicroLED Displays", SID Symposium Digest of Technical Papers, vol. 50 (1), Jun. 1, 2019, 4 Pages.

* cited by examiner

DISPLAY DEVICE WITH LOCAL DECRYPTION OF DIGITAL DATA

TECHNICAL FIELD

This document relates to the field of pixel array display devices. It is advantageously applicable to the manufacture of large screens.

STATE OF PRIOR ART

Conventionally, a display device such as a television screen or a computer screen receives a video signal through a video cable, for example an HDMI cable. The video signal corresponds to a digital signal coding, without compression, brightness values to be displayed for each pixel of an image (generally at least three values for each pixel, that is, one for each colour, in the case of RGB pixels). This video signal is, for example, calculated by a graphics card of a device (computer, decoder, etc.) to which the display device is connected via the video cable.

In practice, the video signal received by the display device is received by a video card which performs various data decoding, conversion and distribution operations to a pixel array of the display device. The video card can perform all or part of a digital-to-analogue conversion of the data intended for the pixel array. In the most common case where the digital-to-analogue conversion is performed in the video card, the video card outputs analogue values that can be displayed by the pixel array. In the case where the video card sends digital values to the pixels, the video card has to ensure the generation of a set of pixel control signals to control the display time of each pixel, for example with PWM (pulse width modulation) or BCM (binary coded modulation) control signals. In these examples of pixel control signals, there is no digital-to-analogue conversion as each pixel is controlled in an "on/off" manner, or in other words, "transmit/don't transmit".

Each pixel of the display device generally comprises a plurality of luminous elements for displaying one pixel of each of the images to be displayed by the device. A pixel generally includes at least three luminous elements that can be modulated in intensity and each dedicated to one of the colours red, green and blue. Each luminous element can include either a light emitter modulated in intensity directly in the target colour of this element (case of the OLED) or composed of a blue light source which is filtered and/or added with phosphors to obtain the target colour (case of other types of LED), or a luminous modulator (case of liquid crystals) coupled with a suitable coloured filter to obtain, from a white light emitted by a source common to the pixels, the target colour.

The analogue values obtained after digital-to-analogue conversion or the emission times for each pixel are proportional to the light intensity levels to be displayed by each of the luminous elements of the pixels. Each luminous element can be coupled to a selection transistor for controlling the display of the luminous signal by the luminous element. The display device also includes row drivers controlling the selection transistors, and column drivers sending the values corresponding to the data to be displayed to the pixels.

To secure the exchange of data (corresponding to an image or video intended to be displayed by a display device), for example between two computers, encryption methods are used (with symmetric or asymmetric keys, etc.). The data is encrypted by the first computer and then sent to the second computer which decrypts it. The decrypted data is then transformed into a video signal by the graphics card of the second computer, and the video signal is sent to a display device to which the second computer is connected.

In such a configuration, the video signal sent by the graphics card to the display device is not encrypted and is therefore vulnerable. An interception of the data is for example possible within the second computer where the decryption is performed.

U.S. Pat. No. 7,206,943 provides a way to perform encryption between a computer and a screen coupled to the computer. To this end, an integrated circuit dedicated to decryption is added to the screen, upstream of the screen's video card. Although this solution secures the link between the computer and the screen, the data transmitted and received by the computer remains vulnerable in the screen.

Similar solutions are provided in documents EP 1 343 321 and "Implementing Cryptography on TFT Technology for Secure Display Applications" by P. Oikonomakos et al, CARDIS'06: Proceedings of the 7th IFIP WG 8.8/11.2 international conference on Smart Card Research and Advanced Applications, April 2006, Pages 32-47. However, these solutions have the same disadvantage.

DISCLOSURE OF THE INVENTION

Therefore there is a need to provide a display device with an architecture that improves the security of transmission of an image or video signal into the pixels of the display device.

To this end, one embodiment provides a display device including at least:
- an array of display blocks, each display block being configured to display several pixels of an image and comprising several luminous elements and at least one driving circuit configured to generate control signals for the luminous elements of the display block from digital data intended to be displayed by the luminous elements of the display block;
- an array of control circuits, each coupled to and associated with at least one display block;
- a video card comprising at least one input configured to receive an encrypted digital signal to be displayed by the array of display blocks, and at least one output coupled to the array of control circuits, the video card being configured to decode the encrypted digital signal and send, to the control circuits, the encrypted digital data intended to be displayed by the luminous elements and encoded in a format adapted to the array of display blocks;
- wherein each control circuit includes:
  - a first memory circuit configured to receive and store the encrypted digital data corresponding to the digital data intended to be displayed by the luminous elements of the associated display block;
  - a second memory circuit configured to store a decryption key;
  - a decryption circuit coupled to the first and second memory circuits and configured to perform a decryption operation on the encrypted digital data using the decryption key;
- and wherein the decryption operation is carried out, in the decryption circuit of each control circuit, for a group of bits used for displaying pixels by the display block to which said control circuit is associated.

This display device provides for the replacement of conventional row/column addressing with display block addressing. This is made possible by the use of electronic circuits downstream of the video card, namely the control circuits associated with the display blocks and the driving circuits. By virtue of this configuration, which makes it possible to group certain operations on the data to be displayed, the wiring required to address the luminous elements is simplified and requires fewer wires. In addition, the electronic chips generally disposed at the periphery of the array of luminous elements are eliminated and the wiring of the rows or columns can disappear, which makes this configuration particularly advantageous for manufacturing large screens.

A major difference between a conventional display device and the proposed display device is that the data sent as an output from the video card are digital here, and the generation of the control signals for the luminous elements is performed within each display block comprising the luminous elements.

In this display device, the array of display blocks includes all the elements enabling a decryption operation on the encrypted digital data received by the display device to be performed within this array and not outside it as in prior art. Thus, the data to be displayed are secured until they are displayed by the array of display blocks. In addition, the data decryption operation is implemented after the transmission of such data from the video card to the array of display blocks, which improves the security of the data to be displayed. The security of the data to be displayed is also improved by the fact that the data intended for each of the display blocks is encrypted.

This allocation into display blocks is particularly adapted to implement encryption/decryption of the digital data to be displayed, as the encryption/decryption algorithms are implemented for groups of several bits. Each group of bits considered for encryption/decryption can therefore correspond to a group of bits relating to the display of pixels by one of the display blocks of the device.

The display blocks may be grouped into groups of display blocks, each group comprising several display blocks. The video card can send the digital data to be displayed in parallel to the different groups, thereby optimising the data transmission speed within the array of display blocks.

The video card, which may also be referred to as the driver card, of the display device may receive the digital data from outside the display device, for example via a cable such as an HDMI cable. The video card, which is used especially to send the digital data to the various display blocks, does not correspond to a graphics card (which is, for example, part of a computer, a decoder, etc.) the role of which is to define and send the complete digital image data to the display device.

The video card corresponds to an electronic card including one or more integrated circuits, and which is dedicated to driving the arrays of control circuits and display blocks. The video card performs various data decoding, conversion and distribution operations for the array of control circuits, from the digital signal received as an input. In the proposed display device, the video card does not perform the digital-to-analogue conversion of the data intended for the luminous elements. The video card may ensure the generation of a set of control signals, for example with PWM (pulse width modulation) or BCM (binary coded modulation) control signals. In addition, the video card may comprise only digital integrated circuits, making it easier to manufacture.

The video card is configured to perform a decoding of the received digital signal and then a new encoding of the digital data obtained according to a format adapted to the array of display blocks, that is, in a format adapted to the control circuits, to the type of luminous elements and to the elements used for the distribution of such data in the display blocks.

The control signals for the luminous elements control each of the luminous elements to display a certain brightness value during a display reference period corresponding to the duration of display of an image by the array of display blocks.

The output of the video card corresponds to a digital data output that is coupled to the array of control circuits by a data distribution circuit or network.

Furthermore, the digital data intended to be displayed by the luminous elements of each display block is derived from the digital signal received by the video card and intended to be displayed by the array of display blocks.

Advantageously, each display block may correspond to a module distinct from the other display blocks and may be transferred to a medium, for example a single medium, on which the array of control circuits is located. Such pixels are very advantageous because they are particularly well adapted to the manufacture of large screens which, for cost reasons, require the use of a medium which is not a semiconductor wafer. The manufacture of the display blocks in the form of such modules also allows more space for the power supply lines of these blocks due to the available medium surface between the modules, which makes it possible to reduce access resistances. This configuration also allows the manufacture of the device's conductor lines in a single tier.

The medium on which the display blocks and control circuits are located may be of the printed circuit type, or more generally may correspond to at least one substrate on which electrically conductive connections are made, for example in the form of rows and columns. This substrate may for example comprise glass, plastic, or metal. The connection rows and columns may be made on this substrate, for example by screen printing, inkjet printing, etc.

Each control circuit may further include another memory circuit, for example called the fourth memory circuit, configured to store decrypted digital data output from the decryption circuit.

Each decryption circuit may be configured to receive as an input additional decryption data, such as an initialisation vector for use in the decryption operation. The use of such an initialisation vector for the encryption and decryption of the data improves the security of the digital data to be displayed.

Each control circuit may include a third memory circuit configured to store a binary number associated with the control circuit (which may be seen as corresponding to a serial number of the control circuit), and the decryption circuit of the control circuit may be configured to perform the decryption operation by further using the binary number associated with the control circuit. The use of such a binary number for the encryption and decryption of the data improves the security of the digital data to be displayed.

The display device may be configured to receive as an input at least one encrypted session key and may further include at least one decryption unit for the encrypted session key, the decryption unit being configured to use at least one private key stored in the decryption unit. In this configuration, the digital data may be transmitted to the display device through asymmetric encryption, thereby improving the security of the transmission of such data to the control circuits and facilitating key distribution. The session key may be a symmetric key and may be obtained using a public key.

Advantageously, each control circuit may include a decryption unit for the encrypted session key. Thus, the decrypted session key is not transmitted from the decryption unit to the control circuits, further improving security over the data.

Each decryption circuit may be configured to perform the decryption operation using digital data previously decrypted by the decryption circuit and/or encrypted digital data previously received by the associated control circuit and/or digital data previously decrypted by the decryption circuit of at least one other control circuit (which corresponds, for example, to a control circuit neighbouring that to which the decryption circuit belongs). For decrypting the digital data corresponding to an image to be displayed, the encryption and decryption may be performed using the encrypted and/or decrypted digital data of at least one image previously displayed by the display device, which has the advantage of not requiring waiting for a data decryption by another decryption circuit. It is also possible for the encryption and decryption to be performed using data from the image to be displayed intended to be displayed by another display block which is, for example, part of the same row as the block for which data decryption is performed.

Each control circuit may further include a decompression circuit configured to perform, after the implementation of the decryption operation, a decompression operation on the decrypted digital data.

The display device may further include at least one FIFO (First In First Out) memory configured to form a buffer storage memory for the encrypted digital data received before the implementation of the decryption operation. Advantageously, each control circuit may comprise such a buffer memory. Such a buffer memory makes it possible to absorb variations in the rate of the received encrypted digital data, particularly when compression is implemented. In a particular embodiment, this FIFO memory may be part of the first memory circuit.

In a particular configuration, the display device may include at least one data bus to which each of the control circuits is coupled, and the first memory circuit of each control circuit may form a data reception circuit configured to identify the encrypted digital data intended to be displayed by the luminous elements of the display block associated with the control circuit.

In this particular configuration, routing of the different digital data parts in the different display blocks may be performed by addressing. This configuration can be implemented regardless of the size of the digital data parts, that is, regardless of the amount of digital data intended for each display block, whether or not this size is constant from one display block to another.

In another particular configuration, the first memory circuits of the control circuits may comprise shift registers serially coupled from one control circuit to another. Such a configuration may be implemented when the size of the digital data parts sent to the display blocks is constant.

Each control circuit may be formed by a chip distinct from the associated display block (with the advantage that all display blocks may be identical), or each control circuit may be integrated into the associated display block.

The driving circuits for the luminous elements may comprise PWM or BCM modulators, or digital-to-analogue converters.

Another embodiment relates to a method for securely transmitting digital data between an encryption device and a display device as described above, including at least the steps of:

sending characteristics of the array of display blocks, characteristics of each display block and additional encryption data from the display device to the encryption device;

encrypting the digital data to be sent by the encryption device from the additional encryption data, and using the characteristics of the array of display blocks, and possibly generating additional decryption data associated with the additional encryption data;

sending the encrypted digital data to the display device, possibly together with the additional decryption data, encrypted or not;

decrypting, by the display device, the encrypted digital data, possibly using the additional decryption data and possibly additional data characteristic of the array of display blocks.

The method may further include:

before sending the encrypted digital data to the display device, sending a public key, being part of the additional encryption data, from the display device to the encryption device;

encrypting a session key with the public key, the session key being used to encrypt the digital data to be sent, the encrypted session key being sent as additional decryption data from the encryption device to the display device;

and wherein the decryption may be implemented with the session key decrypted with a private key stored in the display device.

The use of a session key as described above corresponds to one possibility of implementing the method. However, the method may be implemented in a different way.

The method may further include:

before encrypting the digital data, compressing the digital data to be sent to the display device;

after decrypting the digital data, decompressing the decrypted digital data.

Advantageously, the compression may be implemented in data blocks the size of which is compatible with that of the data blocks used when encrypting such data.

Throughout the text of this application, the term "coupled" may refer either to a direct connection between two elements, without any intermediate element between them, or to an indirect connection between these two elements, that is, a connection formed through at least one intermediate element.

BRIEF DESCRIPTION OF THE DRAWINGS

The present invention will be better understood upon reading the description of the examples of embodiments given purely for indicative and in no way limiting purposes with reference to the appended drawings in which.

Identical, similar or equivalent parts of the various figures described hereinafter bear the same reference numerals so as to facilitate switching from one figure to another.

Figure 1:
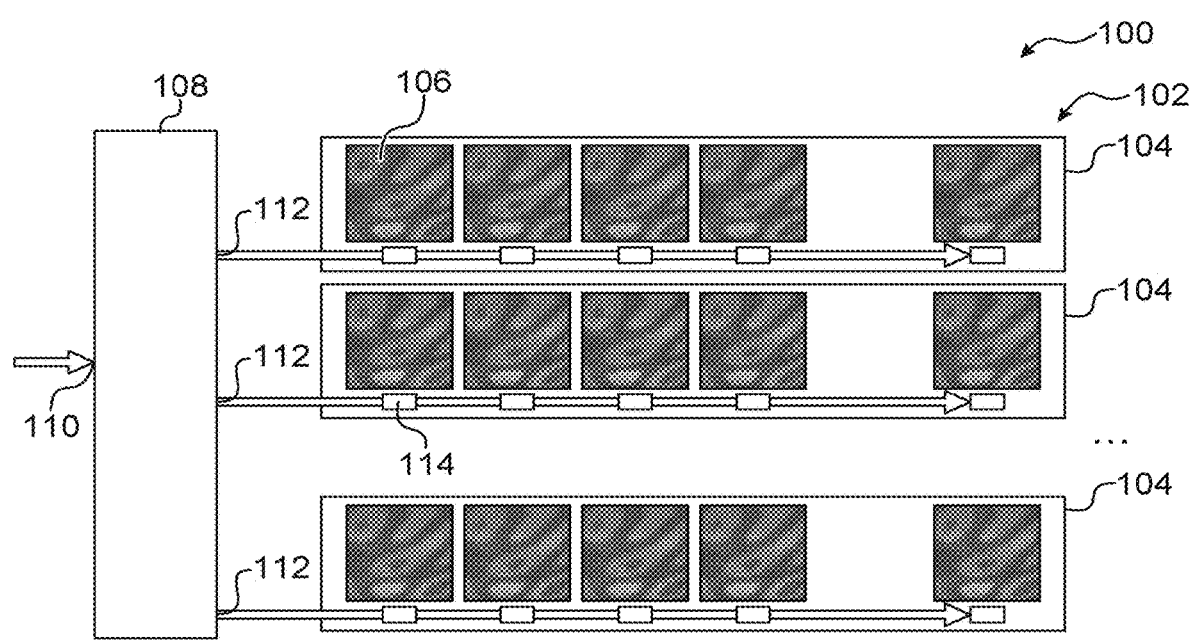
FIG. 1 schematically shows a display device according to a first embodiment.

The various parts shown in the figures are not necessarily to a uniform scale, in order to make the figures more readable.

The various possibilities (alternatives and embodiments) shall be understood as not being exclusive of each other and may be combined with each other.

DETAILED DISCLOSURE OF PARTICULAR EMBODIMENTS

A display device 100 according to a first embodiment is described below in connection with FIGS. 1 and 2.

The device 100 comprises an array 102 of display blocks 106. Each display block 106 in the array 102 is configured to display at least one pixel of an image intended to be displayed by the device 100. In the example of embodiment described herein, each display block 106 is configured to display several pixels of each image intended to be displayed by the device 100.

Each display block 106 includes several distinct luminous elements 118. The luminous elements 118 correspond to, for example, LEDs (or microLEDs) or OLEDs.

In addition to the one or more luminous elements 118, each display block 106 also includes memory circuits 120 configured to store the decrypted digital data intended to be displayed by the luminous elements 118 of the display block 106, and driving circuits 122 configured to generate control signals for these luminous elements 118 from the decrypted digital data intended to be displayed by the luminous elements 118 of the display block 106 and stored in the memory circuits 120 of the display block 106. Each memory circuit 120 and each driving circuit 122 may be associated with one or more luminous elements 118.

The integration of these electronic circuits 120, 122, for example made according to CMOS technology, within the display blocks 106 with the luminous elements 118 may be performed as described in documents EP 3 381 060 A1 and "A New Approach for Fabricating High-Performance MicroLED Displays" by F. Templier et al, SID Symposium Digest of Technical Papers, Volume 50 (1), Jun. 1, 2019. For example, the LEDs corresponding to the luminous elements 118 and the electronic circuits 120, 122 of different display blocks 106 may be made on different substrates 103, then cut out, assembled in the form of distinct modules 105 (each display block 106 corresponding to a module 105 distinct from the other display blocks 106) and finally transferred to a medium 107, corresponding for example to one or more printed circuits or to one or more substrates as described above, intended to also be used as a medium for the other elements of the device 100.

Figure 10:
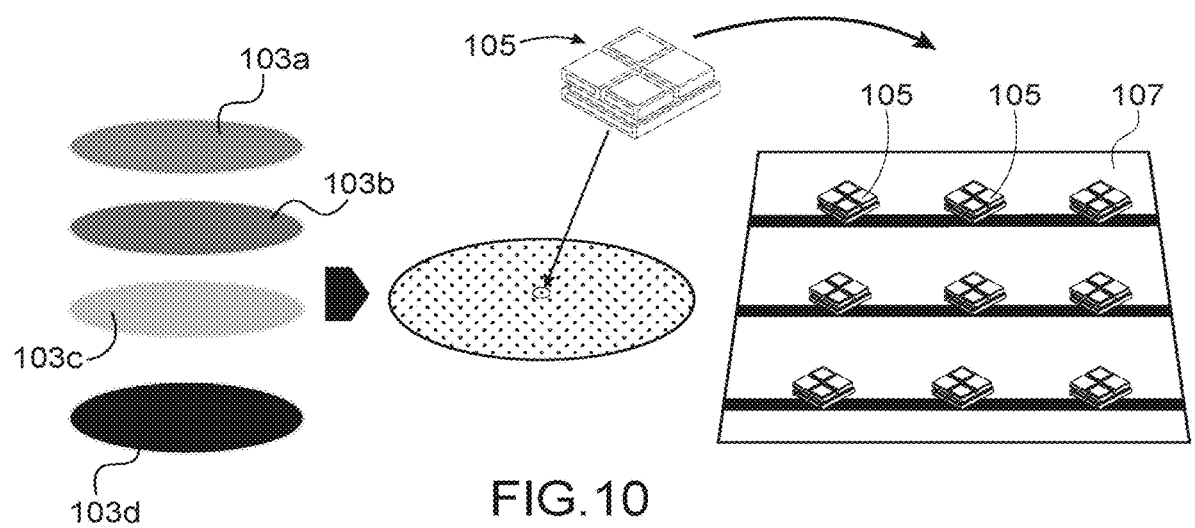
FIG. 10 schematically shows an example of embodiment of electronic chips integrating luminous elements and control electronics of a display device.

FIG. 10 schematically shows the implementation of such an integration of the display blocks 106 in the form of modules 105. In the example of this figure, luminous elements 118 intended to emit each of the colours red, green and blue are made on different semiconductor wafers referenced 103$a$, 103$b$ and 103$c$ for each of these colours. The electronic circuits (in this case circuits 120 and 122) are made according to CMOS technology on another semiconductor wafer 103$d$. The luminous elements 118 made on the wafers 103$a$, 103$b$ and 103$c$ are cut out and then assembled on the wafer 103$d$. The display blocks 106 obtained are cut out into independent modules 105. Alternatively, the luminous elements 118 may be made on a single wafer, and the emission of a different colour by these luminous elements 118 is obtained by adding phosphors on the luminous elements 118 intended to perform a red or green colour light emission. In this case, the wafer on which the luminous elements 118 are made can be attached to the wafer 103$d$ without prior cutting of the luminous elements 118.

Each module 105 forms a display block 106 comprising the various luminous elements 118 of the display block 106, disposed on a CMOS part in which the electronic circuits of the display block 106 are made. These modules 105 are then transferred to the medium, bearing the reference 107 in FIG. 10, at a desired distance from each other.

Thus, each module 105 forms a compact assembly of one or more electronic chips (advantageously obtained according to microelectronic component manufacturing methods), provided with a connection face including connection pads intended to be fixed and electrically connected to connection pads corresponding to the transfer medium. Thus, each module 105 comprises a monolithic chip or an assembly of several electrically connected monolithic chips, and a plurality of modules, for example identical or similar, are mounted to a same transfer substrate, each module corresponding to, for example, a display block of the display device. As an example, the elementary modules of the described display devices each comprise a plurality of LEDs and a transistor-based control circuit, and may be manufactured according to the same or similar methods as described in patent application WO 2017089676.

Alternatively, and especially when the display device 100 corresponds to a small screen such as those integrated in virtual reality glasses, all the circuits of the display device 100 may be made on a same semiconductor substrate.

The device 100 may correspond to a colour screen and each pixel of the image displayed by the device 100 is for example obtained with three distinct luminous elements 118, each intended to emit a luminous signal of one of the colours red, green or blue.

Alternatively, each pixel of the image displayed by the device 100 may be displayed by more than three distinct luminous elements 118, as for example when the device 100 is a multiscopic device intended to simultaneously display an image in several points of view (for the purpose of displaying this image in 3D), with for example in this case each pixel of the image displayed by the device 100 being displayed by as many distinct luminous elements 118, or sets of luminous elements 118, as there are points of view of the image to be displayed. Such an alternative is described in detail below.

Alternatively, each pixel of the image displayed by the device 100 may be obtained with a single luminous element 118, for example when the device 100 corresponds to a monochrome screen.

In the particular configuration shown in FIG. 1, the array 102 is divided into several groups 104. Each group 104 comprises several display blocks 106.

According to an example of embodiment, the groups 104 form rows of display blocks 106. The display blocks 106 are, for example, configured to display blocks of 8×8 pixels of the image displayed by the device 100. Other sizes of display blocks 106 are possible, and are, for example, configured to each display a block of 16×16 pixels, 32×32 pixels, etc., of the image displayed by the device 100.

In another configuration, it is possible for the array 102 to have only one group 104 and for all display blocks 106 in the array 102 to be part of that group 104.

The device 100 includes a video card 108 comprising an input 110 configured to receive an at least partially encrypted digital signal corresponding to the image(s), or video(s), intended to be displayed by the device 100. The input 110 is for example of the HDMI type.

The video card 108 may further include at least one memory (not visible in FIG. 1) for storing the encrypted digital data received on the input 110 and corresponding to one or more images to be displayed by the device 100. This memory or these memories are advantageously of the FIFO type.

Figure 9:
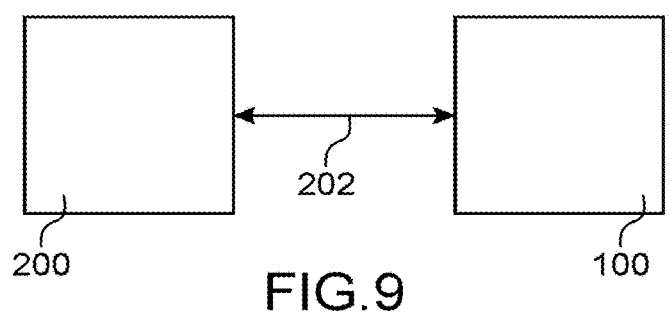
FIG. 9 schematically shows the display device coupled to an encryption device.

The image or video signal received by the device 100 on the input 110 of the video card 108 may come from any electronic or computing device such as a computer, a decoder, etc. FIG. 9 schematically shows the display device 100 coupled to a device 200 intended to perform the encryption of the data to be displayed by the display device 100. A link 202 between the devices 100, 200 is formed for example by an HDMI cable, or even by an additional cable for the transfer of encryption data or additional data for decryption between the devices 100, 200. Thus, it is possible that the device 200 is close to the display device 100, such as when the device 200 corresponds to a computer and the display device 100 corresponds to a screen connected to this computer. Alternatively, it is possible that the device 200 is remote from the display device 100 and coupled to the display device 100 via a computing network such as the Internet. The configuration chosen depends on the line to be secured: local securing of the HDMI link, exchange with a remote user, etc.

The video card 108 includes one or more outputs 112 each coupled to at least one group 104. In the example shown in FIG. 1, each output 112 is coupled to a single group 104. The video card 108 is configured to decode the encrypted digital signal received as an input, encode the encrypted digital data into a format adapted to the array 102, and send it to each of the outputs 112 for display by the display blocks 106 coupled to the output 112. When all the display blocks 106 are part of the same group 104, the video card 108 may include only one output 112.

The display blocks 106 in the array 102 may be allocated in groups 104 configured differently than in the example described above.

In the example shown in FIG. 1, the outputs 112 of the video card 108 are connected directly to the groups 104 of display blocks 106. Alternatively, where the number of groups 104 is too large in relation to the number of outputs 112 available for a single chip, the video card 108 may have a main circuit performing the functions previously described for the video card 108, and intermediate circuits (not used in the configuration shown in FIG. 1) interposed between the main circuit and the groups 104. Each output of the main circuit may be connected to an intermediate circuit, and each intermediate circuit may include several outputs each connected to a group 104 in order to ensure the distribution and allocation of encrypted digital data to the various groups 104.

The device 100 also includes an array of control circuits 114 each coupled to and associated with a display block 106. Each of the control circuits 114 is configured to decrypt, store and send, to the associated display block 106, a part of the digital data sent to the group 104 to which the associated display block 106 belongs and intended to be displayed by the luminous elements 118 of the associated display block 106.

An example of embodiment of one of the control circuits 114 of the display device 100 according to the first embodiment is described below in connection with FIG. 2.

Each control circuit 114 includes a first memory circuit forming a circuit for receiving encrypted data and corresponding, in this example of embodiment, to a shift register 116. The encrypted digital data is transmitted within the or each group 104 by serially connecting the shift registers 116 of the control circuits 114 of a same group 104. Each control circuit 114 may include an amplifier 117, or buffer, to ensure that the amplitude level of the data transmitted from one control circuit 114 to another is maintained. In the or each group 104, the shift register 116 of a first control circuit 114 has its input connected to the or one of the outputs 112 of the video card 108, or to one of the outputs of one of the intermediate circuits when the video card 108 includes such intermediate circuits. The synchronisation of the shift register 116 may be controlled by a clock signal transmitted over a wire 138 which is connected to a clock input of the shift register 116. This clock signal may synchronise the shift registers 116 of all control circuits 114 in the array 102.

Alternatively, in each group 104, the encrypted digital data may be transmitted on a data bus to which all of the control circuits 114 are coupled in parallel. The identification, by each of the circuits 114, of the encrypted digital data intended for it may in this case be performed by decoding addresses associated with the data, this decoding being performed by an address decoding circuit integrated into each of the control circuits 114. In this case, the circuit ensuring the storage of the encrypted digital data within each of the control circuits 114 may not be a shift register.

In the example shown in FIG. 1, the control circuits 114 are made in the form of electronic chips distinct from the chips comprising the display blocks 106. Alternatively, it is possible that each of the control circuits 114 is formed within the same chip as the chip having the associated display block 106, thereby facilitating the distribution of data between the control circuit 114 and the memory circuits 120 of the display block 106 on the chip.

The memory circuits 120 are each configured to store decrypted digital data intended to be displayed by the luminous element(s) 118 coupled to the memory circuit 120. The memory capacity of each memory circuit 120 corresponds to at least the number of bits (for example, 8) over which the data to be displayed by the one or more luminous elements 118 coupled to the memory circuit 120, and which are here intended to display a pixel of the image displayed by the device 100, is coded.

In a particular configuration, within each display block 106, the decrypted digital data to be displayed is propagated by serially connecting the memory circuits 120 (which include shift registers to this end). In FIG. 2, the link between the output of one memory circuit 120 and the input of a subsequent memory circuit 120 includes an amplifier or buffer 121 to maintain the level of data signals transmitted from one memory circuit 120 to another.

In an alternative configuration, the decrypted digital data to be displayed may be propagated through all memory circuits 120 of the display block 106 connected in parallel. Addressing of the decrypted digital data is in this case performed so that each memory circuit 120 identifies, via an address decoding circuit, the data intended for it.

The digital data received by the device 100 on the input 110 of the video card 108 and then transmitted by the video card 108 to the control circuits 114 are encrypted and are intended to be decrypted in the control circuits 114. To perform this decryption, each control circuit 114 includes electronic circuits implementing this data decryption.

As previously indicated, each control circuit 114 includes a first memory circuit configured to receive and store the encrypted digital data corresponding to the digital data intended to be displayed by the luminous elements 118 of the associated display block 106. In the first embodiment described herein, this first memory circuit corresponds to the shift register 116.

Each control circuit 114 also includes a second memory circuit 124 configured to store encryption characteristics including at least one decryption key. This decryption key is advantageously a symmetrical key, that is, a key similar to that used to encrypt the encrypted digital data received by the display device 100. Furthermore, this decryption key advantageously corresponds to a session key intended to be modified regularly between the display of different images by the display device 100, for example on display of each image or corresponding to different sessions. The decryption key is preferably exchanged, between the display device 100 and the device encrypting the digital data, separately or not from the encrypted digital data, via a cable distinct or not from that used for the transmission of the encrypted digital data between the display device 100 and the device having performed the encryption of the data.

Figure 2:
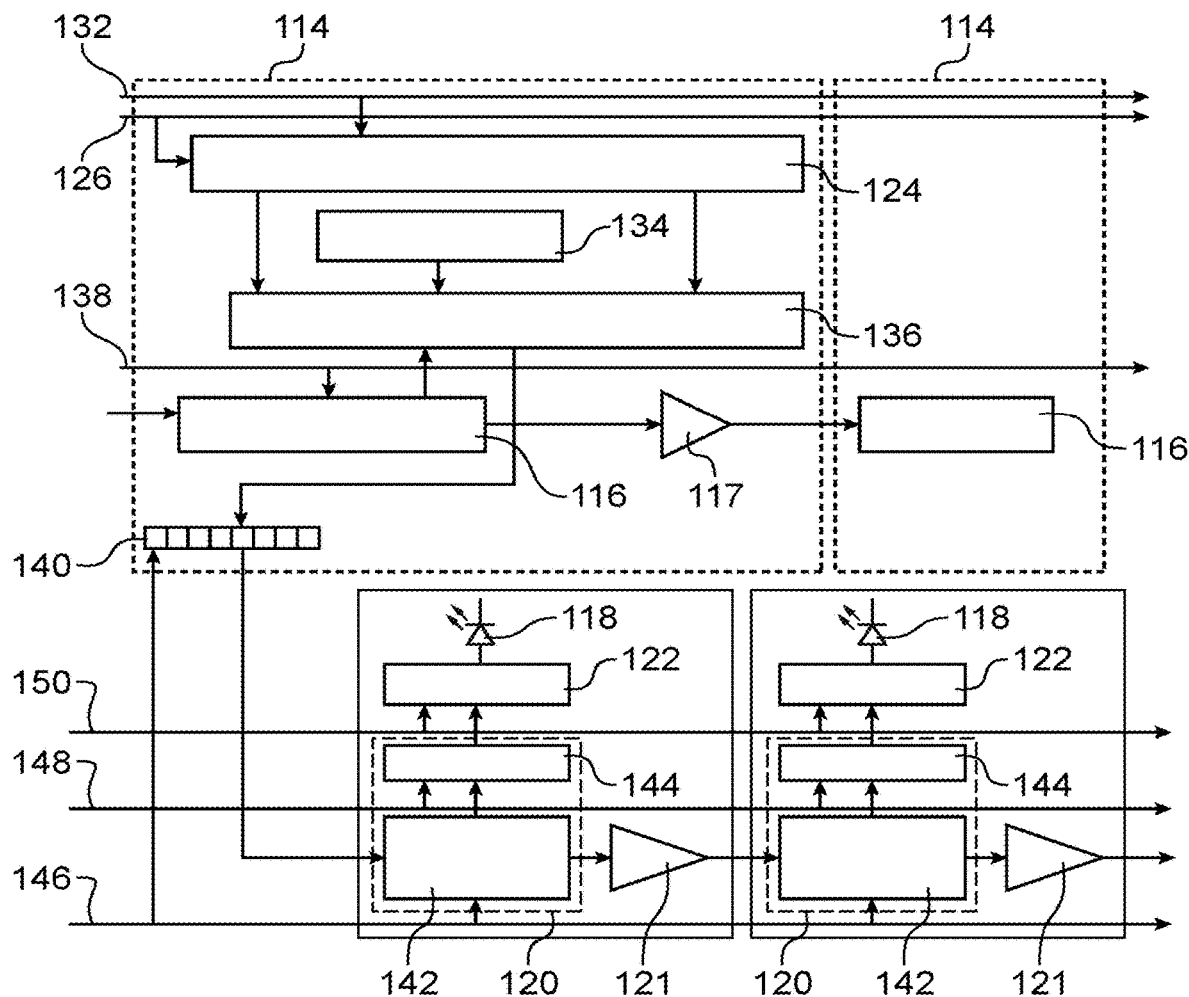
FIG. 2 schematically shows a control circuit of the display device and a part of a display block with which the control circuit is associated, according to the first embodiment.

In the example of embodiment shown in FIG. 2, each control circuit 114 may also receive as an input additional decryption data such as an initialisation vector, corresponding for example to a random binary number initially chosen during the encryption of the data, used as an input data during this encryption and transmitted to the display device 100. The use of such an initialisation vector, which is optional, makes it possible to avoid two encryptions of a same image encrypted with the same encryption key leading to the same result. The initialisation vector received by all the control circuits 114 may be the same, which avoids having to implement addressing for sending this initialisation vector to the control circuits 114.

In the example of embodiment shown in FIG. 2, the decryption key and the initialisation vector are transmitted on a same wire 126 to which each of the control circuits 114 is connected via the second memory circuit 124 configured to store additional decryption data such as the initialisation vector and the decryption key prior to their use in decrypting the data. Furthermore, in this example of embodiment, the reception of the data by the second memory circuit 124 is synchronised by a clock signal transmitted over a wire 132 to which the second memory circuit 124 is connected. Alternatively, it is possible that the second memory circuit 124 is synchronised by a same clock signal as that used to synchronise the shift register 116 (one of the two wires 132, 138 may be omitted).

In the example of embodiment shown in FIG. 2, each control circuit 114 optionally includes a memory element 134 in which is stored another binary number, called a serial number, associated with the control circuit 114 (each control circuit 114 having a serial number of the others) and which corresponds to a parameter also used in the encryption of data. This serial number is, for example, a number of fixed value that can be hardware coded, that is, in a read-only memory, in the control circuit 114, for example by conductive tracks of the chip forming the control circuit 114 and which, depending on whether they are each connected to a power supply line or to ground, define a sequence of binary "0" and "1" corresponding to the serial number. The use of such a serial number makes the encryption performed more complex and avoids identical encryption results for identical digital data. When such serial numbers are used, the list of serial numbers is transmitted to the encryption device as part of the additional encryption data, prior to the encryption of the data.

Each control circuit 114 also includes a decryption circuit 136 comprising inputs coupled to the first memory circuit (shift register 116 in the example of FIG. 2), the second memory circuit 124 and the memory element 134, and configured to perform a decryption of the encrypted digital data stored in the register 116 using the decryption key (and the initialisation vector and serial number in the example of FIG. 2). This decryption operation corresponds, for example, to a block decryption algorithm performed between the encrypted digital data and the decryption key, with which the serial number and initialisation vector may be associated.

In the first embodiment, each control circuit 114 also includes another memory circuit 140, for example called the fourth memory circuit, configured to store the decrypted digital data output from the decryption circuit 136.

The memory capacity of the memory circuit 140 is, for example, at least equal to the total number of bits on which the data to be displayed by each display block 106 is coded. For example, for blocks 106 of 8×8 pixels, each comprising a single luminous element 118 displaying data coded on 8 bits, the capacity of each of such memory circuits 140 is for example equal to 512 bits.

The encrypted digital data received by the display device 100 has been previously encrypted taking the characteristics of the array 102 of the display device 100 into account, such as for example: dimensions of the array 102, total number of pixels displayable by the array 102, number of display blocks 106, arrangement of these display blocks 106 in the array 102, number of displayable pixels per display block 106, number of luminous elements 118 displaying each pixel, list of serial numbers associated with the display blocks 106.

Here, data decryption is performed per display block 106. In other words, the digital data intended to be displayed by each of the display blocks 106 is decrypted together. The characteristics of each display block 106 are therefore transmitted to the encryption device: its size in number of bits, the algorithm to be used, the possible serial number, its position in the array 102. Furthermore, the key exchange method is also transmitted to the encryption device, for example a symmetric key exchange or a session key encryption by a public key. A different session key may be used for each display block 106, or the session keys may be changed regularly.

Furthermore, the encryption and decryption performed for the data in each display block 106 may be performed in sub-block sequence. For example, AES-type encryption using 128-bit data blocks for the data intended for each display block 106 may be performed several times, sequentially or in parallel.

Once the digital data has been decrypted by the decryption circuits 136 and stored in the memory circuits 140, it is sent to the memory circuits 120 of the display blocks 106.

In the example of embodiment shown in FIG. 2, each memory circuit 120 includes a shift register 142 (which can store a number of bits equal to the number of bits on which the data to be displayed by the luminous element 118 associated with this memory circuit 120 is coded) coupled to a latch 144 ("latch" circuit, the memory capacity of which is at least equal to that of the shift register 142). One of the registers 142 of the display block 106, for example for displaying the first pixel of the data to be displayed by the display block 106, receives as an input the decrypted digital data stored in the memory circuit 140 of the associated control circuit 114. The shift registers 142 are serially coupled, via their data inputs and outputs, within each display block 106 via the amplifiers 121, or buffer. All of the shift registers 142 in the display block 106 receive as an input a shift clock signal, generated by the control circuit 114 or by the video card 108, passing through a wire referenced 146, which is also applied as an input to the memory circuit 140 and which controls the shifting of data in the registers 142. The latches 144 of the display block 106 receive a storage trigger signal, for example generated by the control circuit 114 or the video card 108, which controls the storage of the digital values present in the shift registers 142 in the latches 144. This storage trigger signal passes through, in FIG. 2, a wire bearing the reference 148.

A display control signal, or conversion clock signal, passes through a wire 150 and is applied as an input to the driving circuits 122 to control the conversion of the decrypted digital data into control signals applied as an input to the luminous elements 118. In the example of embodiment described herein, each circuit 122 corresponds to a PWM modulator converting the digital data to be displayed by the luminous element 118 to which it is coupled into a PWM (pulse width modulation) modulated analogue signal. The output of each driving circuit 122 is coupled to one of the luminous elements 118. The conversion clock signal may be generated by the control circuit 114 or by the video card 108. The frequency of the conversion clock signal is chosen to be sufficiently high to avoid flicker problems, and for example between 100 and 1,000 times the image display frequency of the device 100, or even higher, such as a few MHz or a few tens of MHz (the use of a high frequency has the advantage of reducing the need for precision on the frequency of this signal).

As an alternative to the PWM modulator described above, it is possible that each driving circuit 122 corresponds to a BCM (binary code modulation) modulator. Details of such a modulation applied to the display of an array of pixels are given in document EP 3 550 550 A1.

According to another alternative, each driving circuit 122 may include, instead of the PWM or BCM modulator, a digital-to-analogue converter outputting an analogue signal driving the light emission of one of the luminous elements 118. Each digital-to-analogue converter converts the digital data to be displayed stored in one of the latches 144 into a current sent to the input of the luminous element 118, the value of which is determined, for example, according to a conversion curve adapted to the characteristics of the luminous element 118.

However, compared to digital-to-analogue converters, PWM or BCM modulators have the advantage of being less cumbersome and of sending analogue signals of the same maximum amplitude as an input to the display elements, which facilitates the control of the luminous elements 118.

Because shift registers 142 are used within the display blocks 106, the amount of digital data corresponding to each pixel of the image to be displayed is chosen to be identical for all pixels to be displayed by the luminous elements 118 of the display block 106.

Within each display block 106, the shift registers 142 may be serially connected in different ways: row by row, column by column, in a serpentine fashion, etc. The connection pattern of the registers 142 to each other within each display block 106 is taken into account during encryption so that each register 142 does indeed send the data intended for it to the luminous elements 118.

Furthermore, in the example of embodiment previously described, each assembly of circuits intended to display a pixel of an image to be displayed receives as an input the data signal, a shift clock signal controlling the shift registers 142, a conversion clock signal intended for the PWM or BCM modulators, and a storage trigger signal controlling the latches 144. Alternatively, the circuits for displaying a pixel of the image may receive only a single signal. In this single signal, data may be coded using pulse duration such as, for example:
- a high state of short duration (for example equal to one third of the period) codes a bit in a first state (for example "0");
- a high state of long duration (for example two thirds of the period) codes a bit in a second state (for example "1");
- a low state for an entire period corresponds to a reset, controlling the display of the data in registers 142.

In this configuration, between the control circuits 114 and the circuits 120, 122, an additional circuit generates, from the single received signal, the digital data signal, the shift clock signal controlling the shift registers 142, and the storage trigger signal controlling the storage, in the latches 144, of the data values present in the registers 142. This configuration has the advantage of limiting the number of wires connected to the inputs and outputs of the circuits 120 and 120, thereby facilitating the making of the device 100.

In the example of embodiment described above, all control circuits 114 are identical, except for the stored serial numbers which change from one control circuit 114 to another.

In an alternative embodiment, each control circuit 114 may not take a serial number and/or an initialisation vector into account. In this case, these elements are not used either during encryption or decryption of the digital data.

With the display device 100 according to the first embodiment, it is possible to implement a method for securely transmitting digital data to be displayed implementing the following steps:
- sending characteristics of the array 102 of display blocks 106 and additional encryption data from the display device 100 to an encryption device that includes the digital data to be displayed by the display device 100;
- encrypting the digital data to be sent (in an encrypted manner) by the encryption device using at least one session key obtained from the additional encryption data, and using the characteristics of the array 102;
- sending the encrypted digital data to the display device 100, possibly accompanied by additional decryption data, encrypted or not;
- decrypting, by the display device 100, the encrypted digital data using the session key that has been stored in each control circuit 114 of the display device 100, and possibly using the additional decryption data, and possibly other additional data characteristic of the array 102 of display blocks 106.

In any case, the additional encryption data is sent from the display device 100 to the device 200, and the additional decryption data is sent from the device 200 to the display device 100.

In a second embodiment, it is possible that the decryption key transmitted to all control circuits 120 corresponds to a symmetric type session key encrypted with a public key. In order to be able to be used to decrypt the encrypted digital data, the encrypted session key is decrypted in the device 100 which includes a private key corresponding to the public key used. This second embodiment makes decryption faster and reduces the energy consumption associated with decryption. For example, it is possible to transmit the public key with the characteristics of the display device 100 to the encryption device.

Decryption of this encrypted session key may be performed by one or more decryption units 152 located outside of the display blocks 106, which receives as an input the encrypted session key and uses a private key stored in these units to perform decryption of this session key. The decrypted session key is then transmitted to all control circuits 114 from an output of the decryption unit(s) 152.

Figure 3:
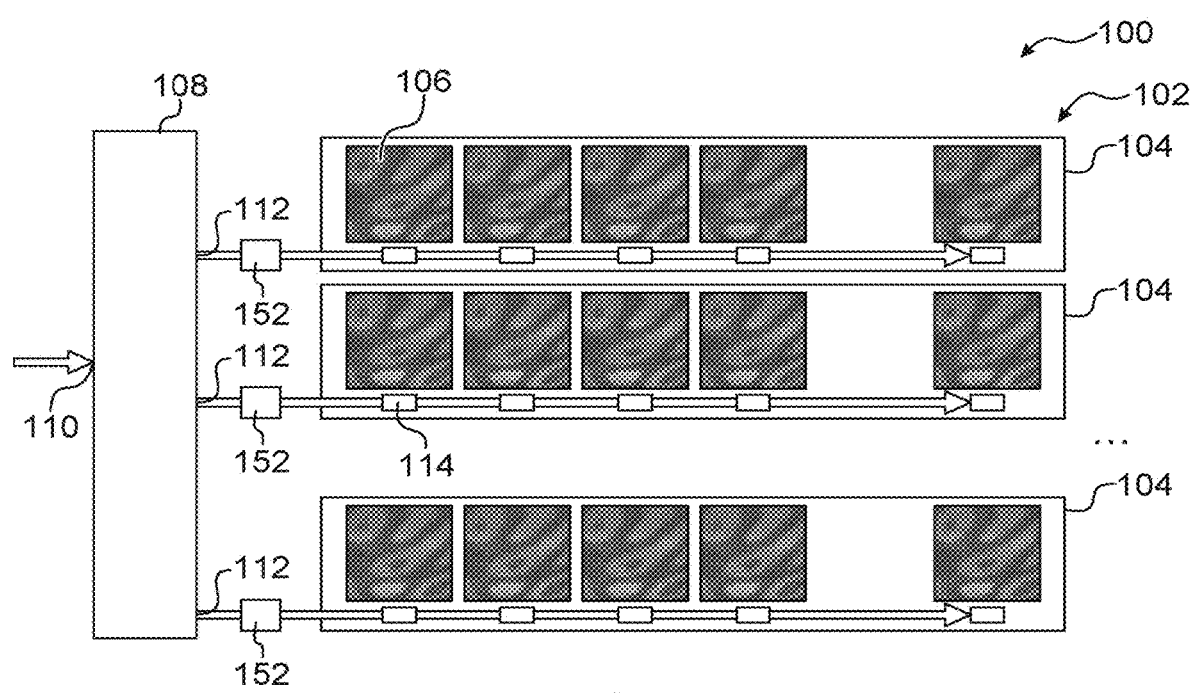
FIG. 3 schematically shows a display device according to a second embodiment.

FIG. 3 schematically shows the device 100 in such a configuration. In the configuration shown in FIG. 3, each decryption unit 152 is associated with one of the groups 104. With several decryption units 152, it is possible to use a different session key for each of the decryption units. According to another alternative, it is possible that the device 100 includes a single decryption unit 152 disposed in the video card 108. The decrypted session key is in this case transmitted to all control circuits 114 from an output of this decryption unit 152. Both of these cases avoid writing a private key to several locations in the array 102, making the initial management and distribution of the pair of keys, public and private, simpler, and increasing security by limiting duplication of the private key in fewer computer chips.

Figure 4:
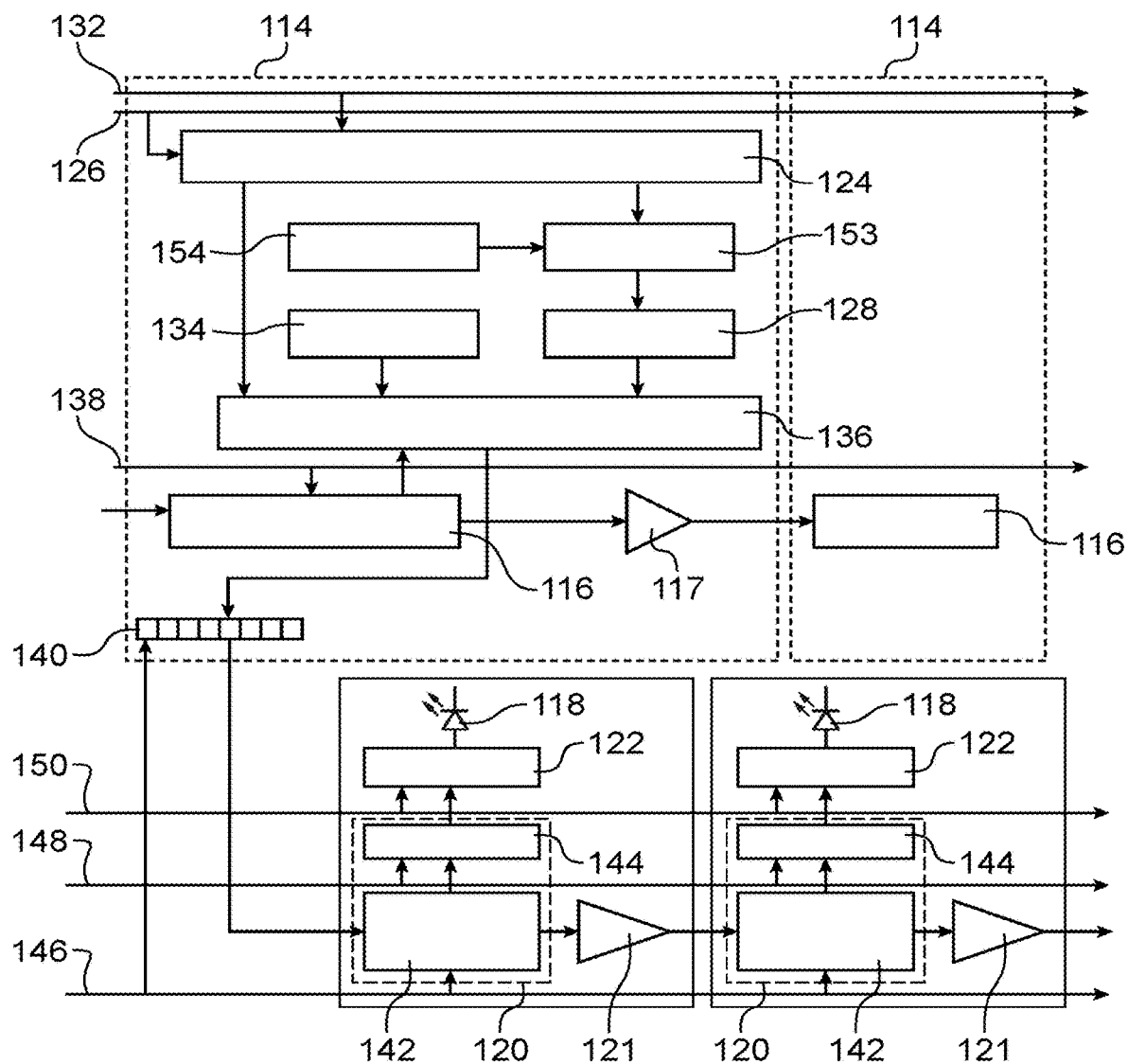
FIG. 4 schematically shows a control circuit of the display device and a part of a display block with which the control circuit is associated, according to an alternative of the second embodiment.

Alternatively, decryption of the encrypted session key may be performed within each control circuit 114. FIG. 4 schematically shows an example of embodiment of a control circuit 114 according to such an alternative.

The control circuit 114 according to this alternative and shown in FIG. 4 comprises all the elements previously described in connection with FIG. 2. In addition to these elements, the control circuit 114 comprises the decryption unit 152 which receives as an input the encrypted session key and a private key stored in another memory circuit 154 of the control circuit 114. The initial programming of this other memory circuit 154 is performed in a secure environment, for example at the factory. After decryption performed by unit 153, the decrypted session key is stored in another memory element 128 the output of which is connected to the decryption circuit 136.

Prior to sending the encrypted data to the display device 100, the display device 100 sends, to the encryption device intended to encrypt the digital data, the public key corresponding to the stored private key, and the additional encryption data corresponding to the characteristics of the encryption algorithm to be used so that the encrypted digital data are adapted to the characteristics of the display device 100 (characteristics and organisation of the array 102, list of serial numbers stored in the control circuits 114, etc.). The encryption device then selects a preferably random session key, and encrypts the data using this session key, possibly deciding on a random initialisation vector, and other encryption information received. The encrypted digital data and additional decryption data (session key encrypted with the public key, initialisation vector, and possibly other information such as for example the encryption method used if the display device 100 is adapted to operate with multiple encryption methods) are then transmitted to the display device 100 for example in a container file sent from the encryption device. The encryption information may be transmitted to the display device 100 via a cable that may or may not be distinct from the cable used to transmit the encrypted data. The display device 100 then decrypts the session key, and uses it to decrypt the encrypted digital data and displays it.

In both of the previously described embodiments, when successively displaying several images, the additional decryption data transmitted to the display device 100 (decryption key and/or serial numbers and/or initialisation vector) may or may not be identical for all images. For example, it is possible that the initialisation vector and/or decryption key may be changed between the display of each image or between the display of several groups of images.

In both of the preceding embodiments, each image is encrypted, sent to the display device 100, and then decrypted by the display device 100 independently of the previously decrypted data displayed by the display device 100.

In a third embodiment, it is possible for the encryption and decryption of the data intended to be displayed by each display block 106 to be performed using the parts of the data of previous images displayed by that display block 106.

Thus, the digital data of an image n intended for a display block 106 may be encrypted using the session key (and possibly an initialisation vector and/or a serial number) and also from the unencrypted digital data of that display block 106 of an image that immediately or not immediately precedes image n. For the first image to be displayed, since the encrypted digital data of the previous image does not exist, a default value, for example "all to zero" will be used instead (blank memory initialisation of the memory circuit 140 when loading a new key).

Figure 5:
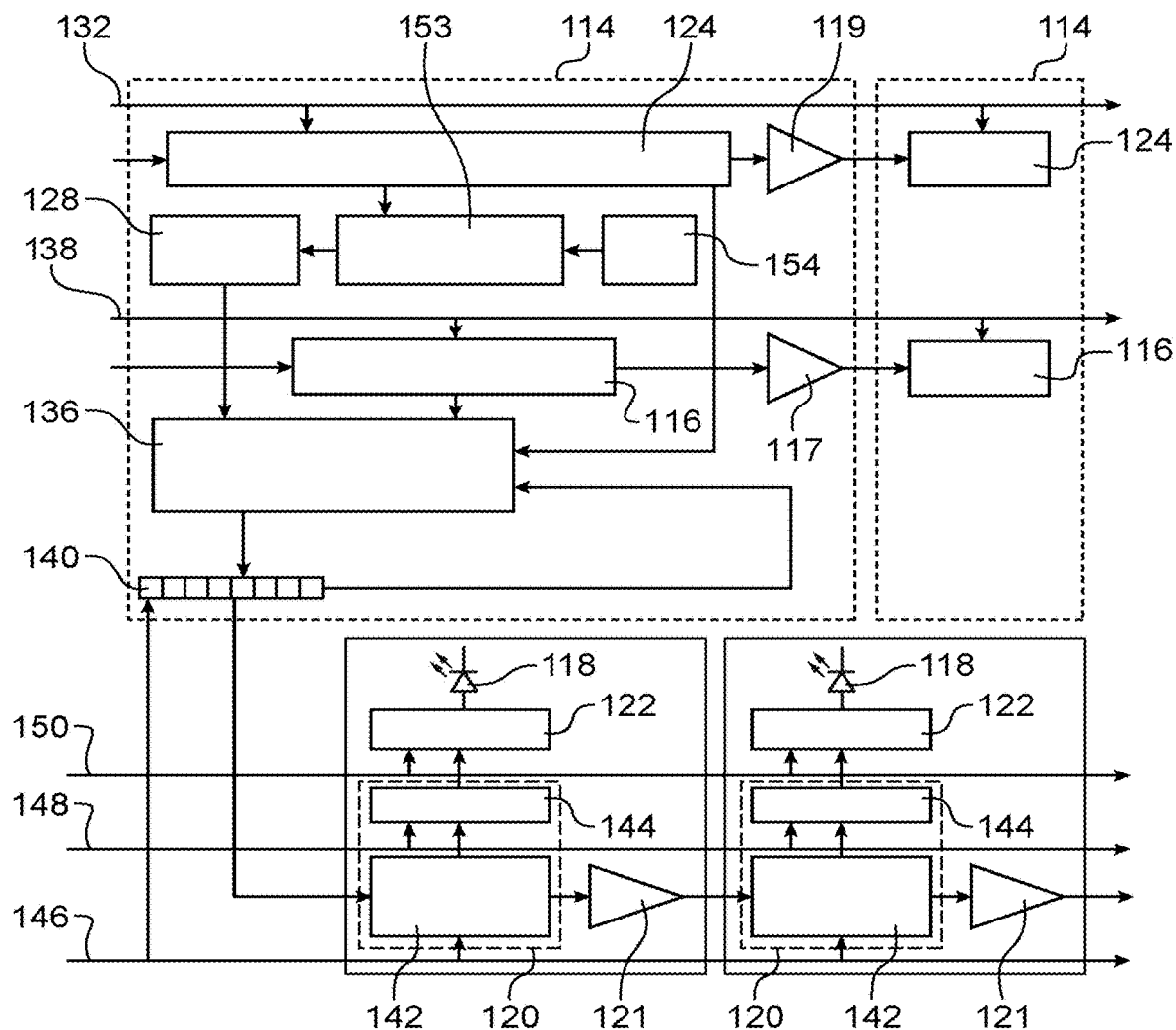
FIG. 5 schematically shows a control circuit of the display device and a part of a display block with which the control circuit is associated, according to a third embodiment.

FIG. 5 shows a control circuit 114 adapted to perform decryption of the encrypted digital data using the unencrypted data of a previous image.

Furthermore, compared to the control circuits 114 previously described in connection with FIGS. 2 and 4, the decryption circuit 136 shown in FIG. 5 receives as an input encrypted digital data of image n and decrypted digital data of image n−1 located in the memory circuit 140, and the initialisation vector. The encrypted digital data of image n and the decrypted digital data of image n−1 are combined (for example by performing an XOR) by the decryption circuit 136. The output digital data is combined with the session key to obtain the decrypted digital data of image n.

Alternatively, it is contemplatable that the encryption and decryption of the data of an image n involves, in addition to the decrypted digital data of image n−1, the encrypted digital data of image n−2, or even the encrypted and/or decrypted digital data of one or more other previous images. In this case, the decryption circuit 136 may keep in memory the encrypted digital data of the previous image(s).

According to another alternative, the encryption and decryption may be performed using the encrypted digital data of one or more of the previous images, but not the unencrypted digital data of such previous image(s).

Figure 6:
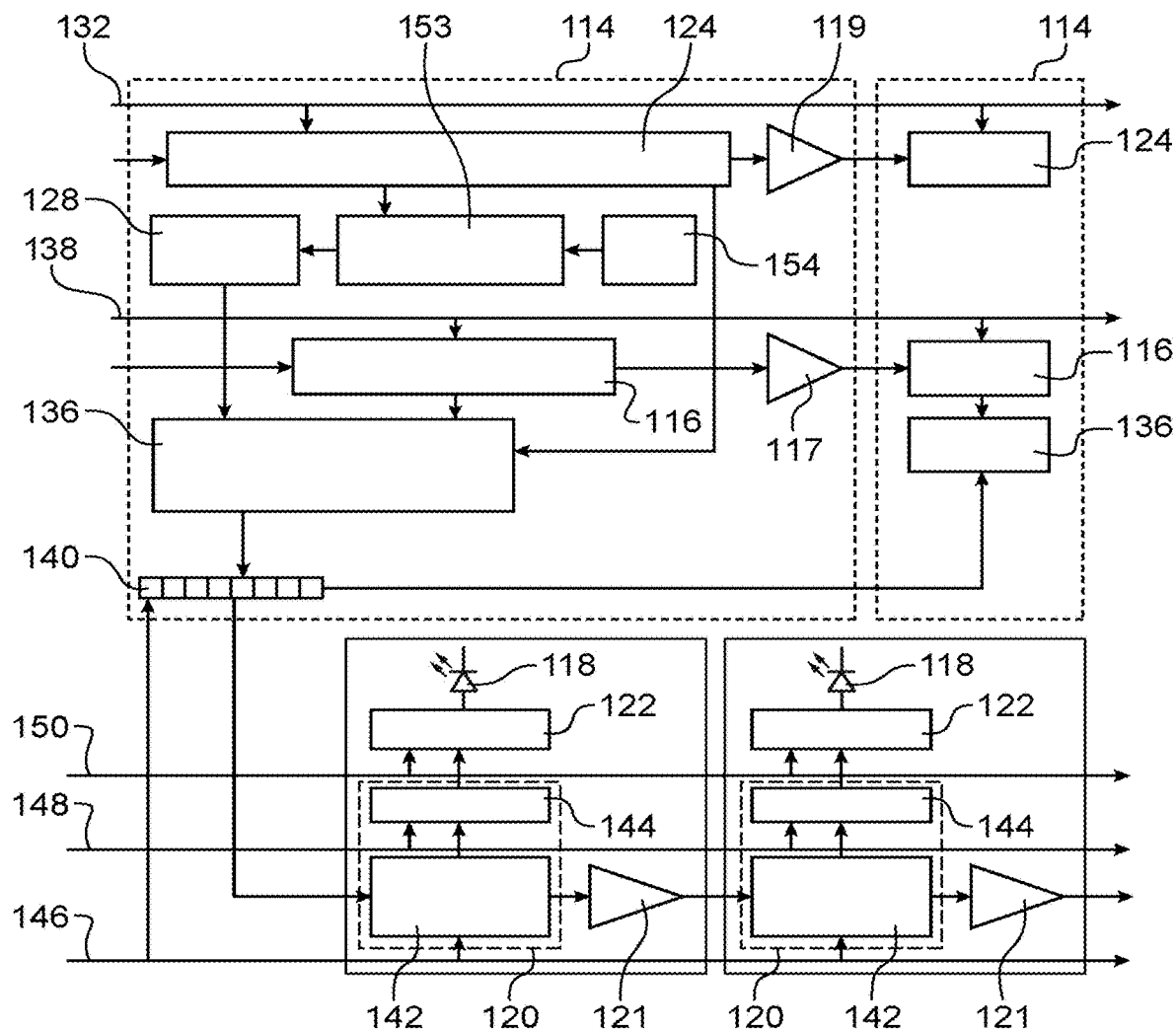
FIG. 6 schematically shows a control circuit of the display device and a part of a display block with which the control circuit is associated, according to a third embodiment.

In another configuration, the encryption and decryption of the data intended to be decrypted in each control circuit 114 may be performed using, as additional encryption and decryption data, digital data intended to be decrypted within another control circuit 114, for example adjacent thereto. FIG. 6 shows such a configuration, in which the decrypted data stored in the memory circuit 140 of a first control circuit 114 is sent, via an amplifier 123, to the input of the decryption circuit 136 of a second control circuit 114.

According to an example of embodiment:
- the display device 100 corresponds to a screen of size equal to 75 inches (1.905 m diagonal) and 4K resolution (array 102 comprising 3,840×2,160 pixels);
- each pixel is displayed by three luminous elements 118;
- the pitch (that is, the distance between the luminous elements displaying two neighbouring pixels) is equal to 432 µm;
- the digital data include 10 bits per pixel;
- the display frequency of the device 100 is 100 Hz;

The total data rate of the digital data displayed in the display device 100 in this case is 25 Gbit/s.

The display blocks 106 are each configured to display a block of 8×8 pixels and are arranged as 270 rows of 480 blocks 106. In this case each row receives a digital data rate of 92 Mbit/s.

The display device 100 comprises in this case 129,600 control circuits 114 each associated with a display block 106. For each image, each display block 106 receives 1,920 bits of encrypted digital data. For the first image, each block 106 receives the same decryption key, for example 256 bits, and possibly about the same amount of bits for additional data (initialisation vector, identification of the algorithm used). The encryption/decryption algorithm shall be chosen to process a block of 1,920 bits. If the algorithm requires a larger integer for a block to be processed, the missing bits may be set to an arbitrary value, for example zero. The algorithm may also be able to process smaller blocks, by processing them in sequence.

In all embodiments, in order to facilitate transport through transmission channels normally devoted to images, it is possible that the encryption information (decryption key, initialisation vector) is mixed with the encrypted digital data when it is transmitted to the display device 100, for example in at least part of the bits of the encrypted digital data intended for certain display blocks 106. These display blocks 106 may in this case not display any digital data, or may display the digital data of neighbouring display blocks 106.

Alternatively, the decryption key, or data (for example a password) from which the decryption key is obtained, may be manually entered into the device 100.

In all embodiments, it is possible that the data received by the device 100 includes at least one bit indicating whether the received digital data is encrypted or not. In this case, the device 100 performs or does not perform a decryption of the received data depending on the value of such bit or bits. In order to limit the amount of additional data, for example, a single bit may be added per block 106 to indicate whether or not that particular block is encrypted.

Furthermore, in all embodiments, it is possible that each decryption circuit 136 may or may not perform decryption depending on the value of at least one authorisation bit, or n-bit coded password, received by the control circuit 114. This authorisation bit or password, which may itself be encrypted to increase the level of security, may be generated from the display device 100, or it may be received by the display device 100 from outside. For example, decryption may or may not be authorised depending on the result of a prior authentication step, for example using a smart card, a switch trigger, or a biometric sensor such as a fingerprint sensor, on the display device 100. The circuit(s) providing authorization verification may be integrated with the control circuits 114, or between the video card 108 and the control circuits 114. The use of a biometric sensor will ensure that only the authorised person can trigger the display, and thus access the secret image transmitted on the display device 100.

Figure 7:
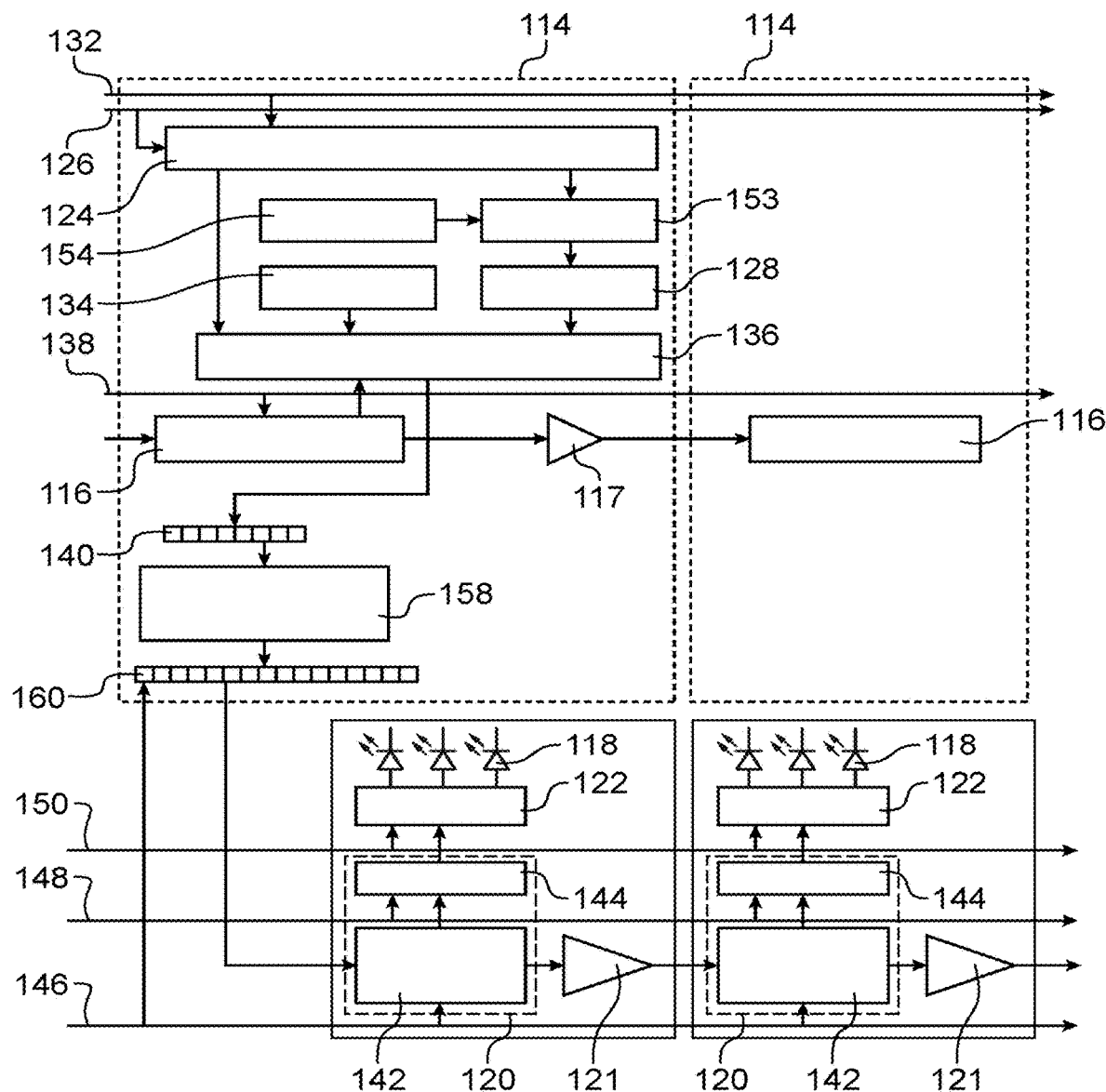
FIG. 7 schematically shows a control circuit of the display device and a part of a display block with which the control circuit is associated, according to a fourth embodiment.

It is possible that the encrypted digital data received by the display device 100 may have been compressed prior to encryption. A control circuit 114 according to such a fourth embodiment is shown in FIG. 7 and includes a circuit for decompressing 158 the decrypted digital data stored in the memory circuit 140. The decrypted and decompressed digital data is then stored in another memory circuit 160 from which the data is then sent to the memory circuits 120.

In the example shown in FIG. 7, decryption of the data is performed with the same elements as those of the control circuits 114 previously described in connection with FIG. 4. However, because the data transmitted to the device 100 and decrypted is compressed, the memory capacities of the various elements of the control circuits 114 may be less than those necessary for decrypting uncompressed data.

As an example, the compression and decompression of data may be performed in accordance with the JPEG format. Other data compression/decompression formats are possible. The size of the blocks may be chosen to be adapted to the decompression algorithm, for example blocks of 8×8 pixels of 24 bits in the case of JPEG, or integer multiples of this size. If common data is required for decompression, it shall be integrated in the encrypted data to make it available at decompression time.

The compression thus performed reduces the data rates of data sent to the device 100 as well as the data rate of the data flowing through the device 100 and sent to the control circuits 114.

This fourth embodiment may be combined with the previously described embodiments and alternatives: use of a symmetrical or asymmetrical decryption key, encryption of the data of an image using or not using data of another image, encryption of a part of the data of an image using or not using other data of the same image.

In this fourth embodiment, it is possible for the decrypted digital data to be displayed to be propagated through all the memory circuits 120 of the display block 106 which are connected in parallel. In this case, addressing of the decrypted digital data is performed so that each memory circuit 120 identifies, via an address decoding circuit, the data intended for it. Such a configuration can be contemplated when the amount of compressed data intended for each control circuit 114 is variable.

Figure 8:
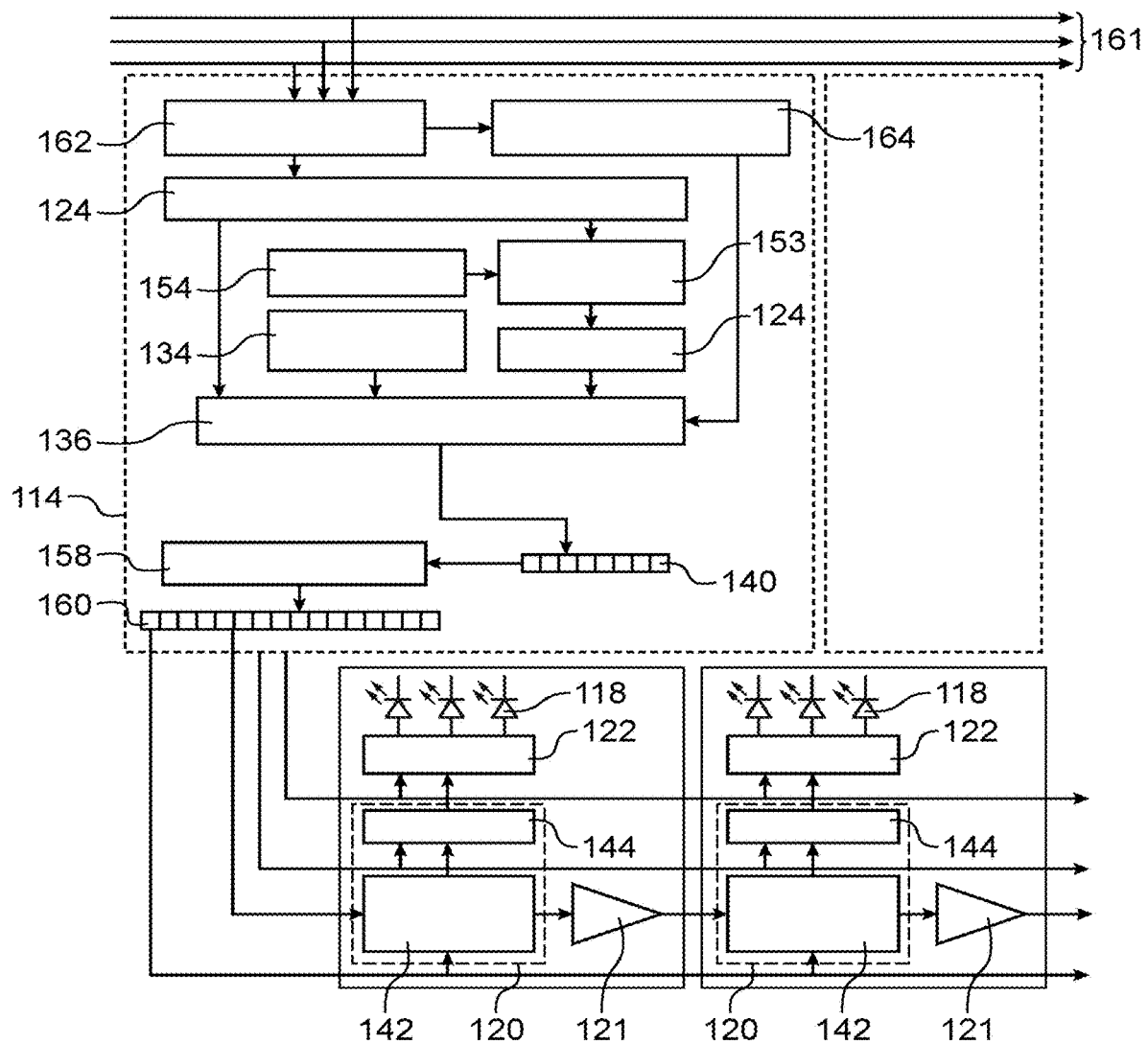
FIG. 8 schematically shows a control circuit of the display device and a part of a display block with which the control circuit is associated, according to a fifth embodiment.

FIG. 8 shows a control circuit 114 according to a fifth embodiment. In this fifth embodiment, the compression and decompression of the data is performed, for example, by a run-length encoding (RLE) algorithm.

Unlike the previous examples of embodiments in which the encrypted digital data is propagated to the control circuits 114 via a serial link of these circuits, the compressed and encrypted data is propagated on a data bus 161 to which all control circuits 114 are connected in parallel. In this example, the bus 161 includes a wire on which the encrypted and compressed digital data is transmitted, a wire on which a clock signal is transmitted, and a wire on which a reset signal is transmitted. The digital data sent over the bus 161 is addressed and each control circuit 114 includes an address decoding circuit 162 which then sends the data intended to be received into a memory 164.

This is different from the previous embodiments and is useful here because the RLE compression algorithm compresses the data with a variable compression ratio, which will result in encrypted data of variable size. The use of addressing to distribute the encrypted digital data to the display blocks 106 allows for different sizes of data for the different display blocks 106.

This is also true for any compression algorithm with a variable compression ratio.

Furthermore, the memory 164 here is FIFO ("First In First Out") type which absorbs variations in data rates due to variations in compression ratio.

The decryption and decompression elements of the control circuit 114 in FIG. 8 are similar to those previously described in connection with FIG. 7.

The decompression of the data is implemented after the decryption of such data. In addition, the digital data is compressed before being encrypted and then sent to the display device 100.

According to an alternative of the configuration shown in FIG. 8, the FIFO type memory 164 may be coupled not between the address decoding circuit 162 and the decryption circuit 136, but between the memory circuit 140 and the decompression circuit 158.

This fifth embodiment may be combined with the previously described embodiments and alternatives: using a symmetric or asymmetric decryption key, encrypting data from one image using or not using data from another image, encrypting part of the data from one image using or not using other data from the same image.

In all embodiments, the video card 108 may include a FIFO type memory to absorb variations in data rates and/or receive data to be displayed in advance.

In the configurations previously described, the data is transmitted on wires distinct from those used for the power supply. Alternatively, it is possible for the digital data to be transmitted by being modulated into the power supply signals. In this case, an additional demodulation step is implemented in the pixels. Details of the embodiment of such an alternative are explained in document EP 3 649 672 A1 and can be applied by analogy in the present invention.

In addition to the elements dedicated to the display of digital data, the display device 100 may include circuits for managing transmission errors (parity code, error correction, signalling bits, etc.).

In all embodiments and alternatives, the control circuits 114 and/or the video card 108 may perform, in addition to sending the digital data to be displayed and the clock signals to each group 104 and/or display block 106, one or more digital processing of the data to be displayed prior to sending it to the groups 104 and/or display blocks 106. This digital processing of the data may correspond, for example, to a brightness correction (which will result in adjusting the intensity of the analogue signals sent to the luminous elements), a gamma correction (which will result in applying adjustment coefficients to the values of the analogue signals sent to the luminous elements according to a colour correction curve for the whole array 102), or a pixel calibration (which will result in applying adjustment coefficients to the values of the analogue signals sent to the luminous elements according to the colours to be corrected). Furthermore, one or more of such digital processing may also be performed directly in each pixel, in this case adding a digital data processing circuit in the pixels.

In various example of embodiments described above, the decryption key used corresponds to a session key encrypted with a public key and which is decrypted with a private key, as in the second embodiment. Alternatively, other types of key distribution may apply.

In all embodiments, it is possible that only part of the digital data to be displayed is encrypted.

In all embodiments, it is possible to perform a screen shot of the displayed data by retrieving the data stored in the memory units 140 (or 160 when the data is compressed).

In all embodiments, the display device 100 can advantageously be used to display a code verification window in which the user is prompted to input a confidential code. Such use is advantageous because of the security provided by the display device 100. For example, when the display device 100 corresponds to a computer screen, the computer itself (CPU+GPU) does not know the position of the digits displayed by the display device 100. It is possible, for example, to ask the user to enter the confidential code and to perform a Turing test. A particularly advantageous configuration will be to have a display device 100 that is touch-sensitive because in this case it is possible to encrypt the response delivered after entering the requested code.

As an alternative to all of the above-described embodiments and examples, it is possible to consider other modes of data transmission: light, radio, etc.

The invention claimed is:

1. A display device, comprising:
an array of display blocks, each display block being configured to display pixels of an image and comprising a plurality of luminous elements and at least one driving circuit configured to generate control signals of the luminous elements of the display block from digital data to be displayed by the luminous elements of the display block;
an array of control circuits, each control circuit being coupled to and associated with at least one of the display blocks; and
a video card comprising at least one input configured to receive an encrypted digital signal, and at least one digital data output coupled to the array of control circuits by a data distribution circuit, the video card being configured to decode the received encrypted digital signal and send, to the control circuits, encrypted digital data to be displayed by the luminous elements, the encrypted digital data being derived from the encrypted digital signal received by the video card and encoded in a format adapted to the array of display blocks,
wherein each control circuit, of the control circuits, includes:
a first memory circuit configured to receive and store the encrypted digital data to be displayed by the luminous elements of the associated display block;
a second memory circuit configured to store a decryption key; and
a decryption circuit coupled to the first and second memory circuits and configured to perform a decryption operation on the encrypted digital data using the stored decryption key; and
wherein the decryption operation is performed, in the decryption circuit of each control circuit, for a group of bits used for displaying pixels by the display block to which said control circuit is associated.

2. The display device according to claim 1, wherein each decryption circuit is configured to receive, as an input, additional decryption data, such as including an initialization vector, for use in the decryption operation.

3. The display device according to claim 1, wherein each control circuit further includes a third memory circuit configured to store a binary number associated with the control circuit, and wherein the decryption circuit of the control circuit is further configured to perform the decryption operation further using the binary number associated with the control circuit.

4. The display device according to claim 1, wherein the display device is configured to receive, as an input, at least one encrypted session key and further includes at least one decryption unit for the at least one encrypted session key,
said at least one decryption unit being configured to use at least one private key stored in the at least one decryption unit.

5. The display device according to claim 4, wherein each control circuit comprises a corresponding decryption unit of the at least one decryption unit for a corresponding encrypted session key of the at least one encrypted session key.

6. The display device according to claim 1, wherein each decryption circuit of a corresponding control circuit is further configured to perform the decryption operation using at least one of: previous digital data previously decrypted by the decryption circuit, the encrypted digital data received by the associated control circuit, or other digital data previously decrypted by the decryption circuit of another control circuit of the control circuits.

7. The display device according to claim 1, wherein each control circuit, of the control circuits, further includes a decompression circuit configured to perform a decompression operation on the decrypted digital data after the performance of the decryption operation.

8. The display device according to claim 1, further including at least one FIFO-type memory configured to form a buffer storage memory for the received encrypted digital data before the performance of the decryption operation.

9. The display device according to claim 1, further including at least one data bus to which each of the control circuits is coupled, and in which the first memory circuit of each control circuit forms a data reception circuit configured to identify the encrypted digital data to be displayed by the luminous elements of the display block associated with the control circuit.

10. The display device according to claim 1, wherein the first memory circuits of the control circuits include shift registers serially coupled from one control circuit, of the control circuits, to another.

11. The display device according to claim 1, wherein each control circuit, of the control circuits, is formed by a chip distinct from the associated display block, or
wherein each control circuit, of the control circuits, is integrated into the associated display block.

12. A method for securely transmitting digital data between an encryption device and the display device according to claim 1, the method comprising:
sending characteristics of the array of display blocks, characteristics of each display block of the display blocks, and additional encryption data from the display device to the encryption device;
encrypting the digital data to be sent by the encryption device from the additional encryption data, and using the characteristics of the array of display blocks, and generating additional decryption data associated with the additional encryption data;
sending the encrypted digital data to the display device, accompanied by the additional decryption data; and
decrypting, by the display device, the encrypted digital data, using the additional decryption data and possibly additional data characteristic of the array of display blocks.

13. The method according to claim 12, further including:
before sending the encrypted digital data to the display device, sending a public key, being part of the additional encryption data, from the display device to the encryption device; and
encrypting a session key encrypted with the public key, the session key being used to encrypt the digital data to be sent, the encrypted session key being sent as the additional decryption data from the encryption device to the display device,
wherein the decryption is performed with the session key decrypted with a private key stored in the display device.

14. The method according to claim 12, further including:
before encrypting the digital data, compressing the digital data to be sent to the display device; and
after decrypting the digital data, decompressing the decrypted digital data.

* * * * *